United States Patent
Ramirez, Jr.

(10) Patent No.: US 6,517,036 B1
(45) Date of Patent: Feb. 11, 2003

(54) WATER COOLER HOLDERS

(76) Inventor: Senovio Ramirez, Jr., P.O. Box 1013, Mercedes, TX (US) 78570

( * ) Notice: Subject to any disclaimer, the term of this patent is extended or adjusted under 35 U.S.C. 154(b) by 0 days.

(21) Appl. No.: 09/935,599

(22) Filed: Aug. 24, 2001

(51) Int. Cl.⁷ .............................................. A47G 23/02
(52) U.S. Cl. ...................................... 248/150; 248/146
(58) Field of Search ................................ 248/150, 166, 248/436, 146

(56) References Cited

U.S. PATENT DOCUMENTS

| | | | | |
|---|---|---|---|---|
| 574,424 | A | * | 1/1897 | Hoffman |
| 717,643 | A | * | 1/1903 | Warren |
| 949,157 | A | * | 2/1910 | Partenheimer |
| D57,688 | S | * | 4/1921 | Lukaszewska |
| 1,392,486 | A | * | 10/1921 | Dice |
| 1,823,616 | A | * | 9/1931 | Leslie |
| 1,929,136 | A | * | 10/1933 | Bertels |
| 2,190,623 | A | * | 2/1940 | Benson |
| 2,925,979 | A | | 2/1960 | Walker |
| 3,545,709 | A | * | 12/1970 | Harvey |
| 3,734,439 | A | | 5/1973 | Wintz |
| 4,006,852 | A | | 2/1977 | Pilsner et al. |
| 4,066,172 | A | * | 1/1978 | Howard |
| D274,782 | S | * | 7/1984 | Little |
| 4,860,986 | A | | 8/1989 | Couzens |
| D343,968 | S | | 2/1994 | Emalfarb et al. |
| D402,161 | S | | 12/1998 | Fischer, Jr. |
| 6,179,266 | B1 | | 1/2001 | Hutten |

* cited by examiner

*Primary Examiner*—Korie Chan
(74) *Attorney, Agent, or Firm*—Richard C. Litman

(57) ABSTRACT

An assortment of water cooler holders made from either metal hollow bars, flat bars and/or wires for removable attachment to various regions of a pickup vehicle, a post or which may be free standing. In one embodiment, the holder has a tripod shape, the three legs being joined by upper and lower tripod support bars pivotally attached to permit collapsing the tripod for transport and storage. In another embodiment, the holder has two parallel rings joined by support bars which hook over the side panel or tailgate of a pickup truck. Another embodiment has two parallel rings supported by an inverted cone attached to a tow bar for attachment to a trailer hitch. Yet another embodiment has two parallel rings with a clamp for attachment to a post.

4 Claims, 14 Drawing Sheets

WATER COOLER HOLDERS

BACKGROUND OF THE INVENTION

1. Field of the Invention

The present invention relates generally to container holders. More specifically, the invention is a holder for holding cylindrical water cooler containers on various places of a pickup truck bed and trailer hitch, a collapsible free standing holder, and a holder attachable to a vertical stud or pole. The holders are wire framed and can be formed in a decorative array.

2. Description of the Related Art

The related art of interest describes various container holders, but none discloses the versatile wire cooler holder device of the present invention. There is a need for an economical and versatile cooler holder assembly amenable to attachment to vehicles or posts, as well as for free standing cooler holders. The related art will be discussed in the order of relevance to the present invention.

U.S. Pat. No. 4,860,986 issued on Aug. 29, 1989, to Kenneth A. Couzens describes four mounting arrangements for a water jug capable of mounting inside or outside the bed of a pickup truck, comprising a vertical arm interconnected at one end to a support, and its other end to a mounting structure. The support has means for supporting the bottom base of the water jug. A jug securing mechanism is integrally formed with a vertical arm for securing the jug at the jug sides to the mounting rack. The mounting structure has means for connecting the mounting rack to a fixed structure such as inside or outside a truck bed, an upright stud, and a wall. In the first embodiment of FIGS. 1 and 2, for positioning the device inside a truck bed on a sidewall, the basic support structure comprises a vertical arm made of a hollow square or rectangular metal rod, e.g., steel, aluminum or solid wood. A flexible semicircular metal arm attached proximate to the top of the rod has flexible belt extensions closable by a buckle for strapping in the jug. The base portion of the vertical rod consists of a central leg having a pair of angularly extending legs on both ends. The vertical rod is positioned adjacent one end of the central leg. The upright rod has a socket leg for attaching over a vertical post of a horizontal U-shaped mounting structure and is locked to an attachment plate on the truck bed's sidewall by an L-shaped interconnecting bracket. In the second embodiment of FIG. 3, the U-shaped bracket is omitted, and the L-shaped bracket is utilized to support the vertical rod. The third embodiment of FIG. 4 utilizes the U-shaped bracket for supporting the vertical rod on a two by four stud with the L-shaped bracket locking the first bracket on the stud. The vertical rod fits on the post of the U-shaped bracket. In the fourth embodiment of FIG. 5, the rack is mounted on a wall by omitting the U-shaped mounting structure, and by adding a U-shaped mounting plate having an upwardly facing shoulder or stop fastened to the wall. The mounting racks are distinguishable for the requirement for the vertical arm or rod with the belted metal arm and the non-foldable four-legged support base.

U.S. Design Pat. No. 343,968 issued on Feb. 8, 1994, to Seymour Emalfarb et al, shows a decorative plant stand design comprising two horizontal wire rings supported by three doubled wire legs ending in covered tips. The bottom horizontal ring has three wire cross braces. The device is distinguishable for lacking collapsible tripod legs and a collapsible container support.

U.S. Design Pat. No. 402,161 issued on Dec. 8, 1998, to Martin P. Fischer, Jr. shows an ornamental bottle holder made of wires with four stacked rings supported by a projecting J-shaped and doubled wire setup. The vertical rear support portion includes a flat crossbar with two apertures for fasteners. The bottle holder is distinguishable for its required attachment portion.

U.S. Pat. No. 2,925,979 issued on Feb. 23, 1960, to William P. Walker describes a paint bucket support for use on a painter's staging comprising a tubular basket having an upper ring and a bottom ring supported by two perpendicular crossbars, of three legs attached to the basket, two legs are joined by two links and a spring to enable movement and each leg has a clamping foot to grasp the opposite edges of the staging. The device is distinguishable for being limited to attachment to staging and having only two legs collapsible.

U.S. Pat. No. 6,179,266 B1 issued on Jun. 30, 2001, to James E. Hutten describes a collapsible easel comprising three rigid plastic telescopic legs, wherein the upper channel leg segments slide and snap-fit into the lower channel leg segments. Three leg support channels are connected to the lower leg portions and joined by an eared connector. The top connector member joins the legs. The device is distinguishable for being limited to telescopic legs and supporting painting boards.

U.S. Pat. No. 3,734,439 issued on May 22, 1973, to Donald E. Wintz describes a beverage container receptacle and clamp mountable and tiltable on an inclined tubular section such as a golf cart handle or a pontoon boat railing. A wire framed receptacle has three horizontal wire rings supported by a pair of upright U-shaped wire members of unequal height, wherein the longer member is hooked onto a horizontal semicircular bracket. The bracket in turn is attached to a clip seated on a vertical hanger plate which is free to rotate on a U-shaped collar positioned on a tubular section of a handle or railing. The device is distinguishable for being limited to its rotatability of the basket to maintain the beverage container in a vertical position.

U.S. Pat. No. 4,006,852 issued on Feb. 8, 1977, to Victor F. Pilsner et al. describes a swingable liquified gas tank carrier attached to the rear bumper of a camper or trailer by an affixed angle iron piece. A latchable bracket extends horizontally from the angle iron to support the tank support with two rings connected by a bent upright arm. The split upper ring is larger and is adjustable in diameter to lock in the gas tank. The latch permits the tank carrier to be pivoted away to open the rear door. The device is distinguishable for its pivotable requirement.

None of the above inventions and patents, taken either singularly or in combination, is seen to describe the instant invention as claimed. Thus, a water cooler holder system solving the aforementioned problems is desired.

SUMMARY OF THE INVENTION

The present invention is directed to an assembly of supports for holding water cooler tanks on various substrates. All the ring supports and some mounting supports are round low carbon steel. The legs are 16 gauge square tubing, black powder coated low carbon steel. The folding rods are flat low carbon steel. The first embodiment is a collapsible tripod floor stand. The second embodiment is a water cooler holder for mounting on the outside of a side panel of a pickup truck bed. The third embodiment is a water cooler holder for mounting on a closed tailgate of a pickup truck. The fourth embodiment is a water cooler holder for mounting on a trailer hitch of a vehicle. The fifth embodiment is a water cooler support mounted on a vertical stud.

The sixth embodiment is a standing ornamental and foldable tripod water cooler support. The seventh embodiment is a collapsible tripod water cooler support with shortened legs.

Accordingly, it is a principal object of the invention to provide an assortment of supports for large water coolers for mounting on various locations.

It is another object of the invention to provide a water cooler support which is collapsible and free standing.

It is a further object of the invention to provide a water cooler support system for mounting on various parts of a pickup truck.

Still another object of the invention is to provide a water cooler support for mounting on a vertical stud or post.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to various wire cooler holders adapted to attach to a vehicle, a pole or to be free standing.

Figure 1A:
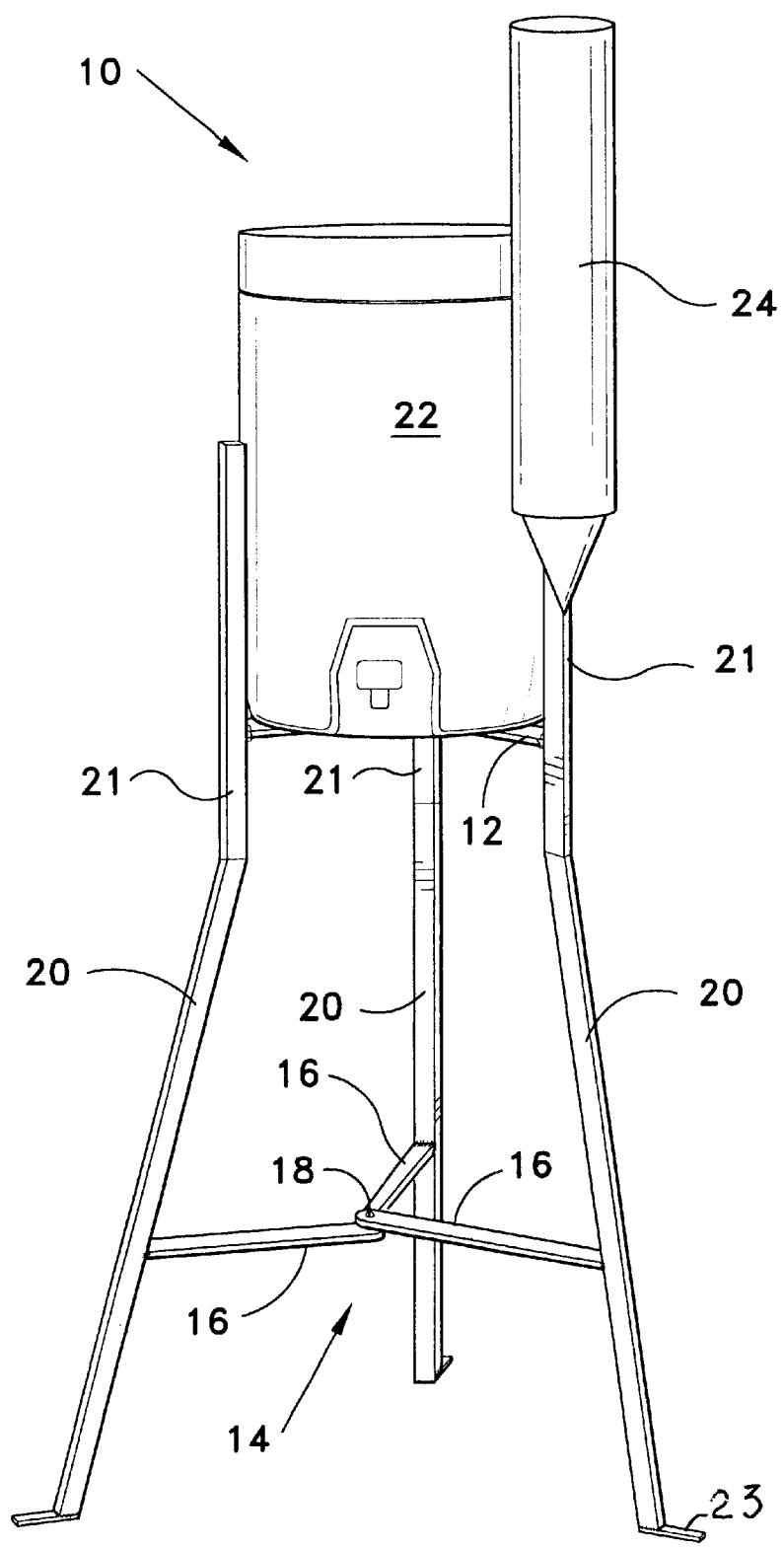
FIG. 1A is an environmental, perspective view of a water cooler with a cup rack supported by a collapsible tripod floor stand according to a first embodiment of the present invention.
Figure 1B:
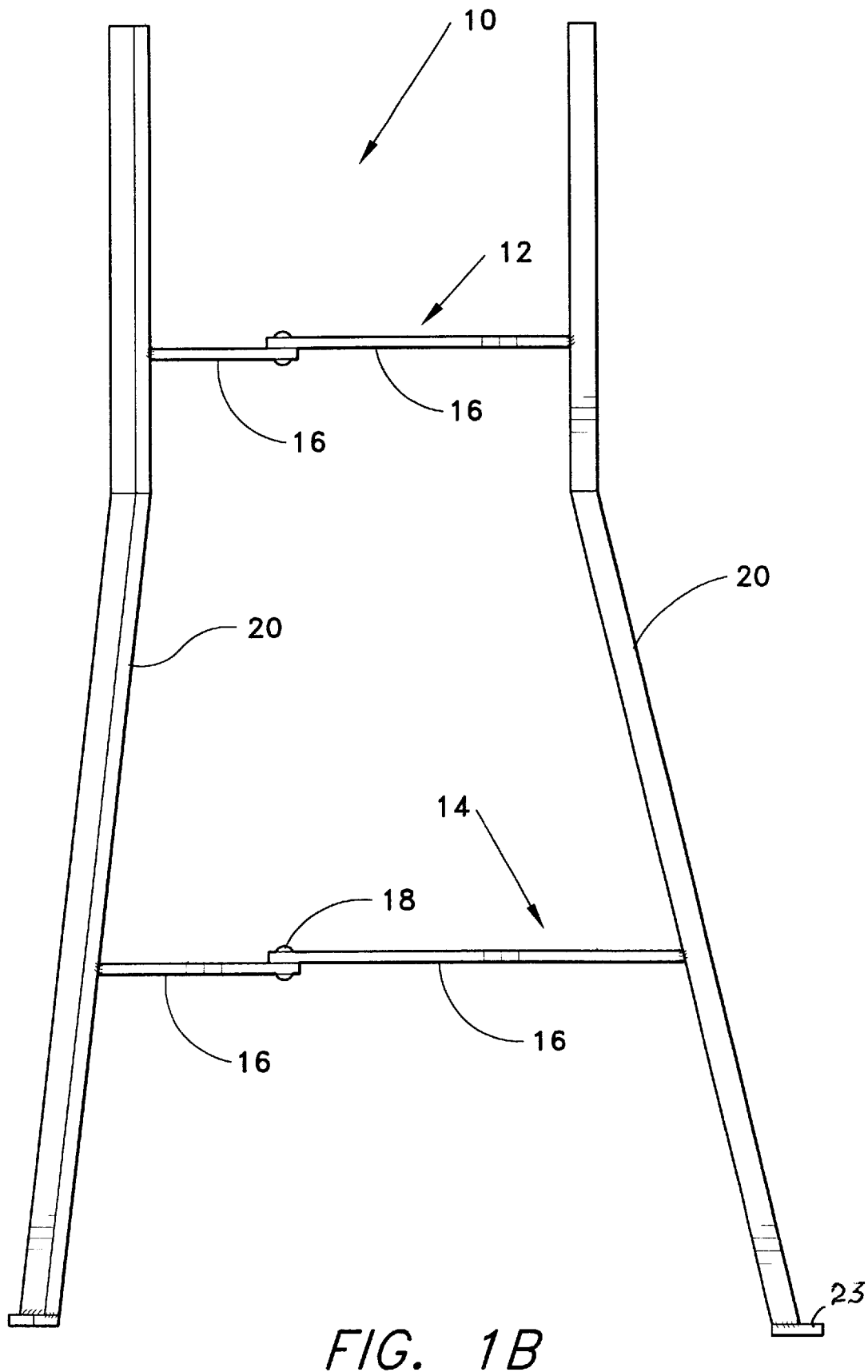
FIG. 1B is a side elevational view of the collapsible floor stand according to the first embodiment of the present invention.
Figure 1C:
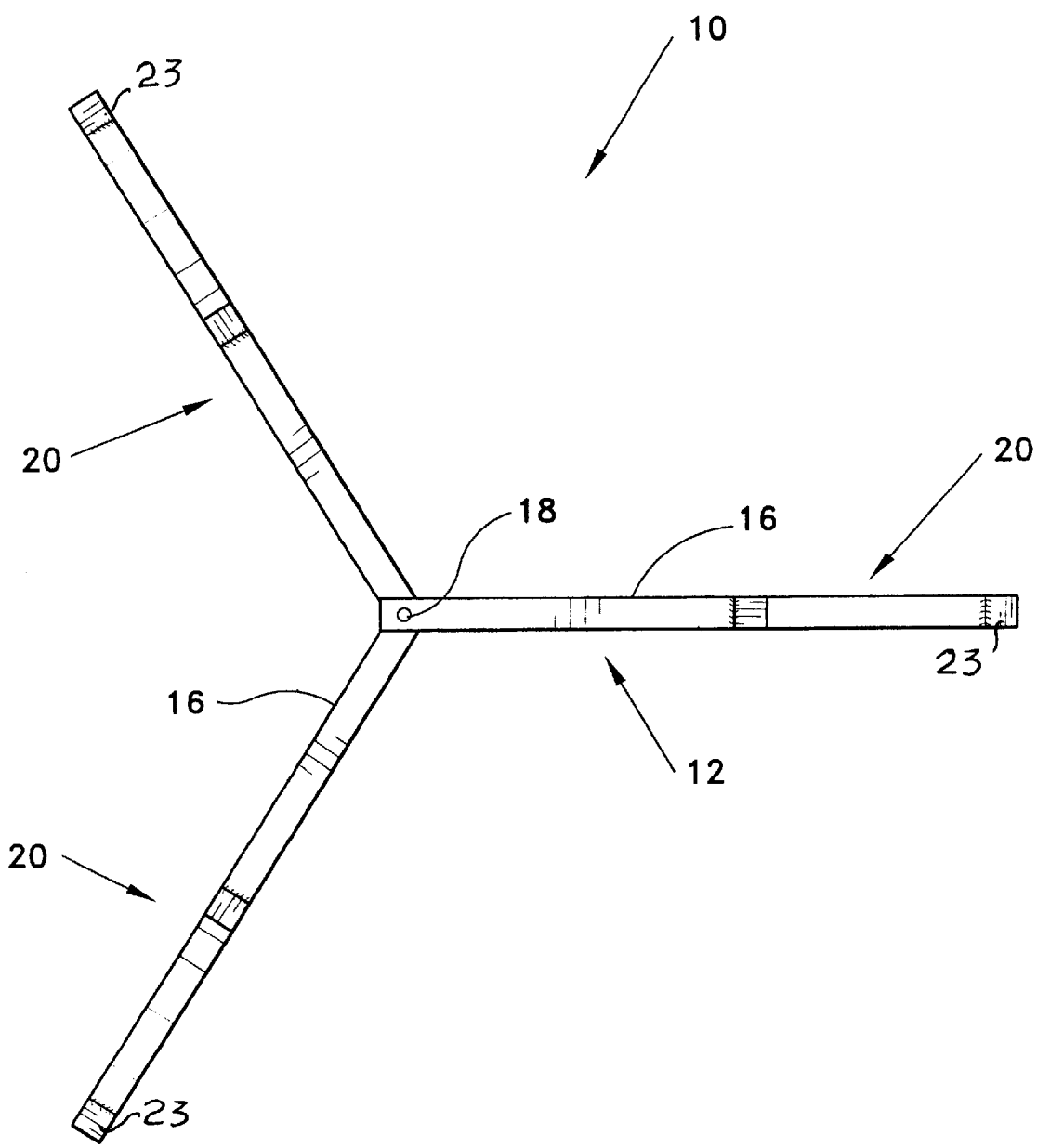
FIG. 1C is a top plan view of the collapsible floor stand according to the first embodiment of the present invention.

In the first embodiment of FIGS. 1A, 1B and 1C, a collapsible tripod cooler floor stand holder 10 has an upper tripod support 12 (partially hidden in FIG. 1A, but shown more fully in FIG. 1C) and a lower tripod support 14 identical in structure, but differing in the length of each horizontal flat folding bar 16, and pivoting on a pivot pin 18 to enable collapsing of the legs for storage or portage. Three upright legs 20 formed from black powder coated 16 gauge, ¾ inch square metal tubing are connected in tripod fashion, each leg having a bend 21 formed below the upper tripod support 12 in order to provide a broad triangular base, each leg 20 ending in an extended foot 23. A cylindrical water cooler 22 supporting a vertical cup stack 24 is based and supported on the bottom by the upper tripod support 12 and on the side by the three upright legs 20.

Figure 2A:
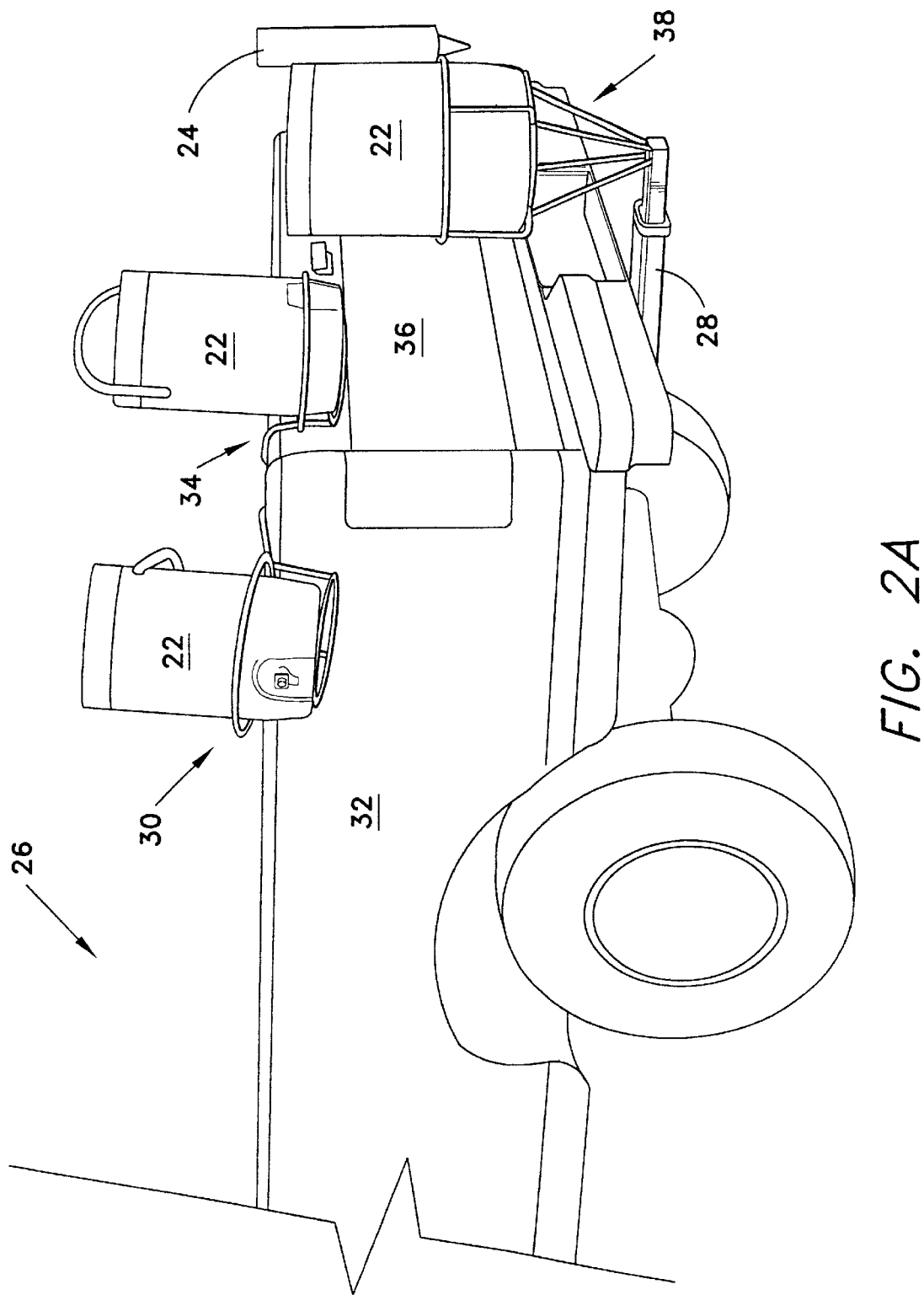
FIG. 2A is an environmental, perspective view of three water coolers in separate holders attached to various parts of a pickup truck according to the present invention.
Figure 2B:
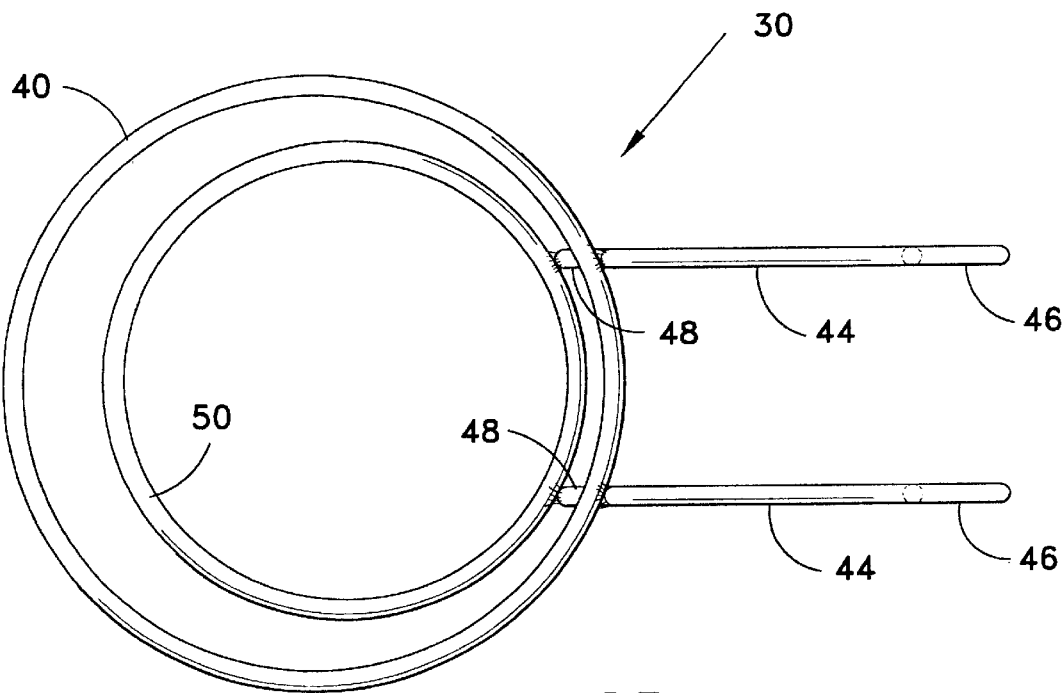
FIG. 2B is a top plan view of a second embodiment of a water cooler holder adapted to be mounted on the top and outside of a side panel of the truck bed according to the present invention.
Figure 2C:
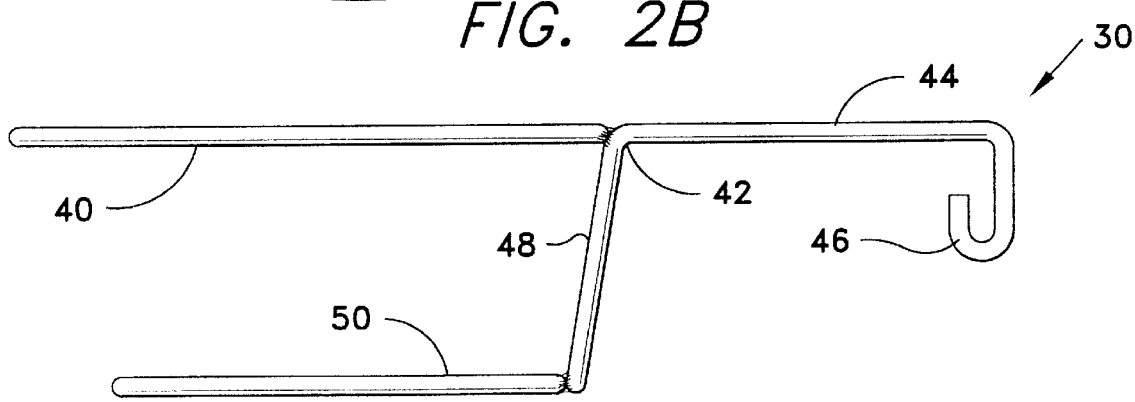
FIG. 2C is a side elevational view of the second embodiment according to the present invention.
Figure 3B:
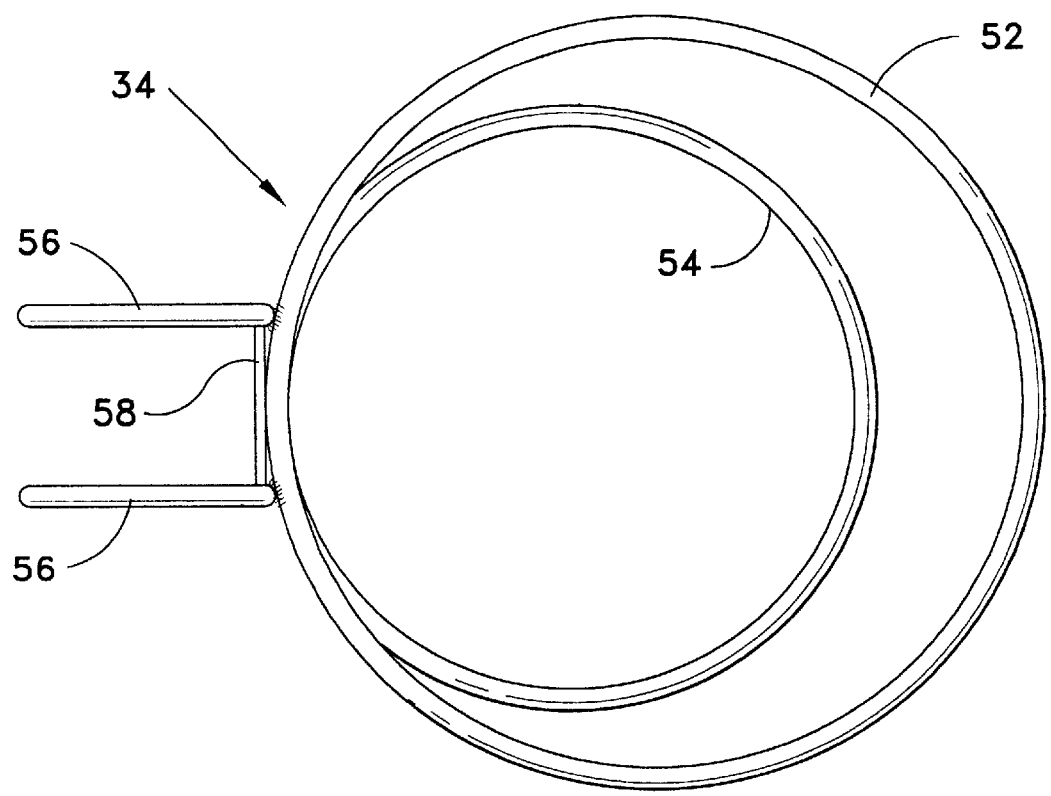
FIG. 3B is a top plan view of the third embodiment according to the present invention.
Figure 3A:
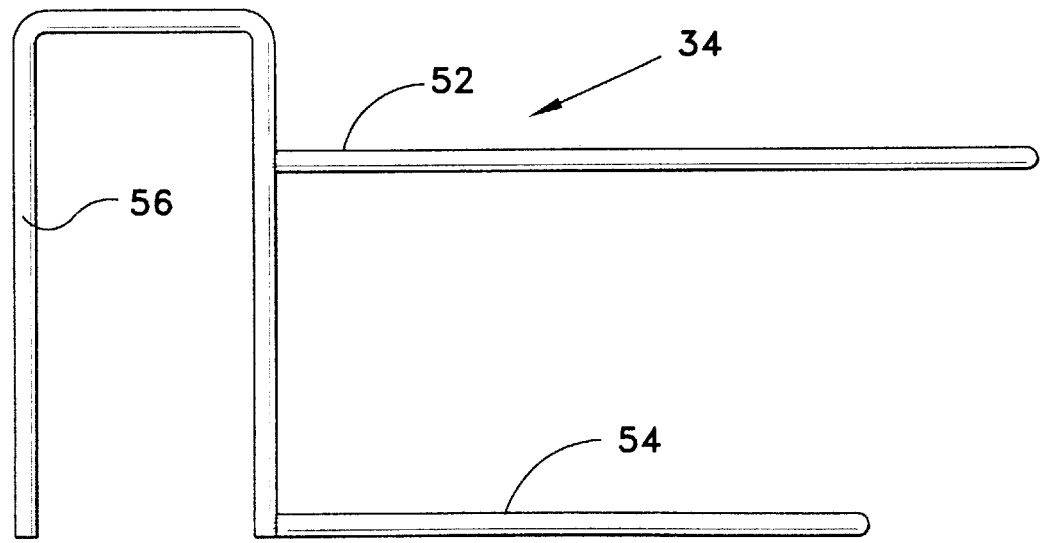
FIG. 3A is a side elevational view of a third embodiment of a water cooler holder adapted to be mounted on the outside of a closed tailgate according to the present invention.

The general configuration for a water cooler holder for mounting on various parts of a pickup truck will be illustrated first as a double-ringed structure which can mounted on various parts of a pickup truck by various appending structures. In FIG. 2A, a pickup truck 26 has an assembly of three different water cooler supports to attach to different parts of a pickup truck with a trailer hitch 28. The second embodiment depicted in FIGS. 2B and 2C is a cooler holder 30 suitable for hanging over a side panel 32. The third embodiment shown in FIGS. 3A and 3B is a cooler holder 34 suitable for hanging over a closed tailgate 36. The fourth embodiment illustrated in FIGS. 4A and 4B is a cooler holder 38 attached to the trailer hitch 28.

Referring back to FIGS. 2B and 2C, the second embodiment water cooler support 30 is made from steel cylindrical rods to form an upper ring 40 having a welded to the bend 42 and coplanar with the pair of horizontal arm segments 44. Each arm segment 44 has a depending hook 46 which overlaps the side panel 32 of the truck 26 in tandem to prevent the cooler 22 from swaying from side to side. The inclined arm segments 48 are welded to the lower ring 50 and serves as a base support for the cooler container 22, the lower ring 50 having a smaller diameter than the upper ring 40. It is a simplified construction which adequately holds and immobilizes the cooler 22 for use.

The third embodiment 34 depicted in FIGS. 3A and 3B is utilized to hang over a closed tailgate 36 (FIG. 2A) for supporting a cooler 22. The holder 34 has an upper ring 52 and a lower ring 54, the lower ring 54 having a smaller diameter than the upper ring 52. The two rings 52 and 54 are welded in parallel and perpendicularly to an inverted U-shaped (in side view) pair of hooks 56. A horizontal reinforcement bar 58 is welded between the hooks 56.

Figure 4A:
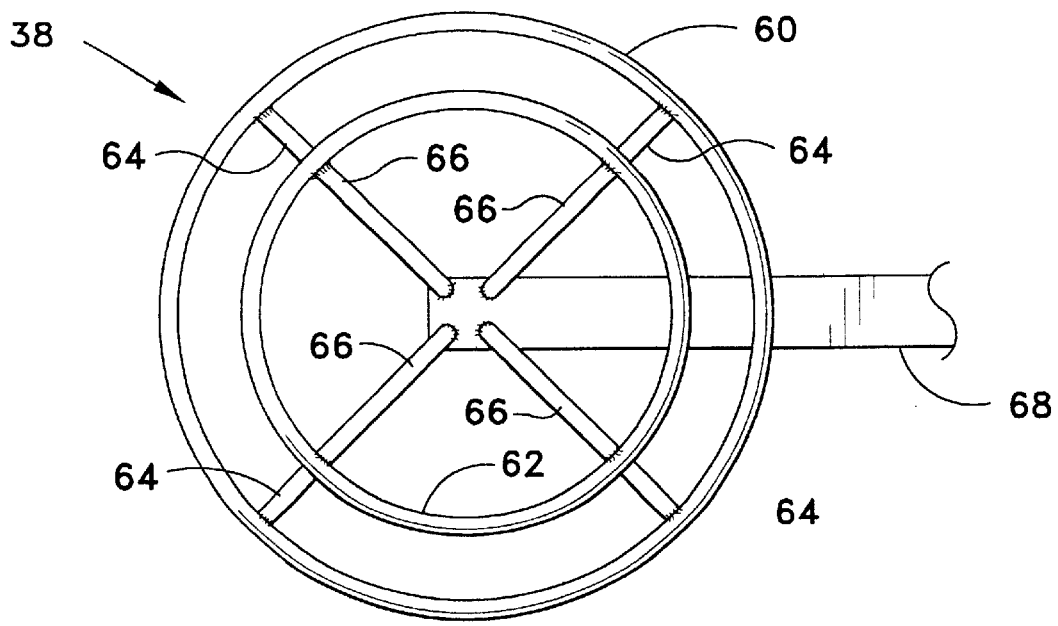
FIG. 4A is a top plan view of a fourth embodiment of a water cooler holder adapted to be mounted on a trailer hitch of a vehicle according to the present invention.
Figure 4B:
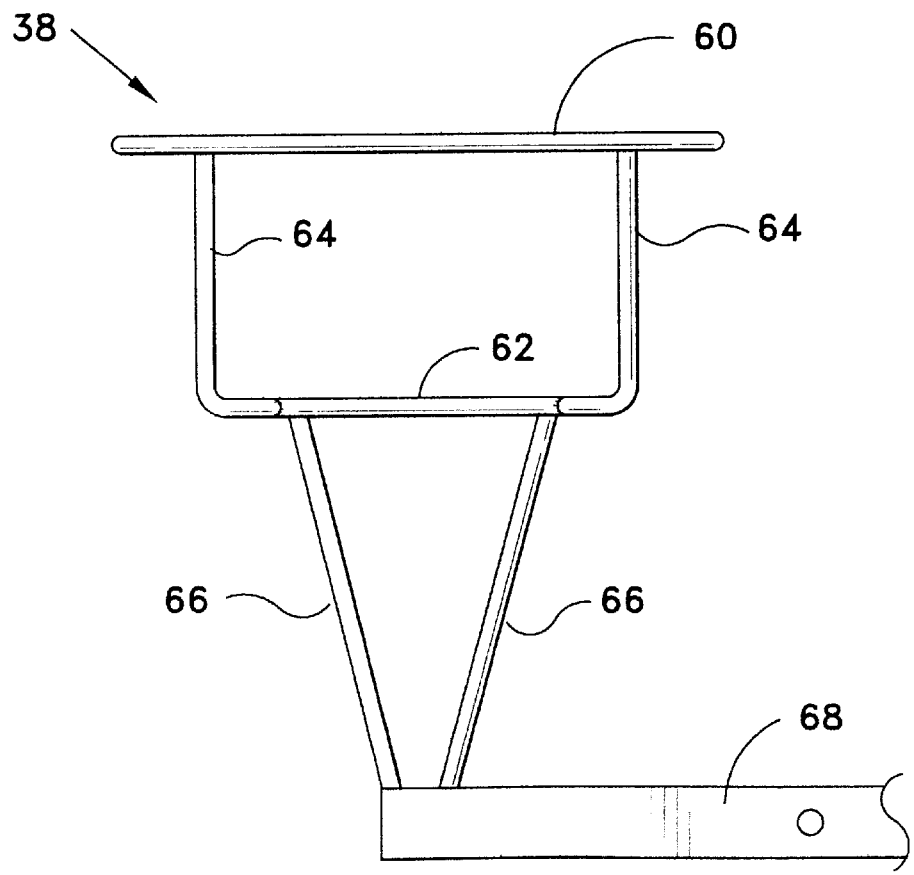
FIG. 4B is a side elevational view of the fourth embodiment of the water cooler holder according to the present invention.

In FIGS. 4A and 4B, a fourth embodiment cooler holder 38 is depicted for attachment to a female trailer hitch 28 existing on the pickup truck 26 (FIG. 2A). The holder 38 comprises an upper ring 60 having a larger diameter than the lower ring 62 which supports the bottom of the cooler 22.

These rings 60, 62 are connected by four bars 64 having a long vertical portion and a short dog-leg portion horizontal to the vertical portion, the four bars being equidistantly spaced on these rings. Four more bars 66 are inclined inwardly from the lower ring 62 and are grouped close to each other to form an inverted conical support, with the apex of the cone attached to a tow bar 68 having a square cross-section for insertion in the female trailer hitch 28 installed on the truck 26 (FIG. 2A). The tow bar 68, and hence the cooler holder 38 are retained by a standard trailer hitch lock pin.

Figure 5A:
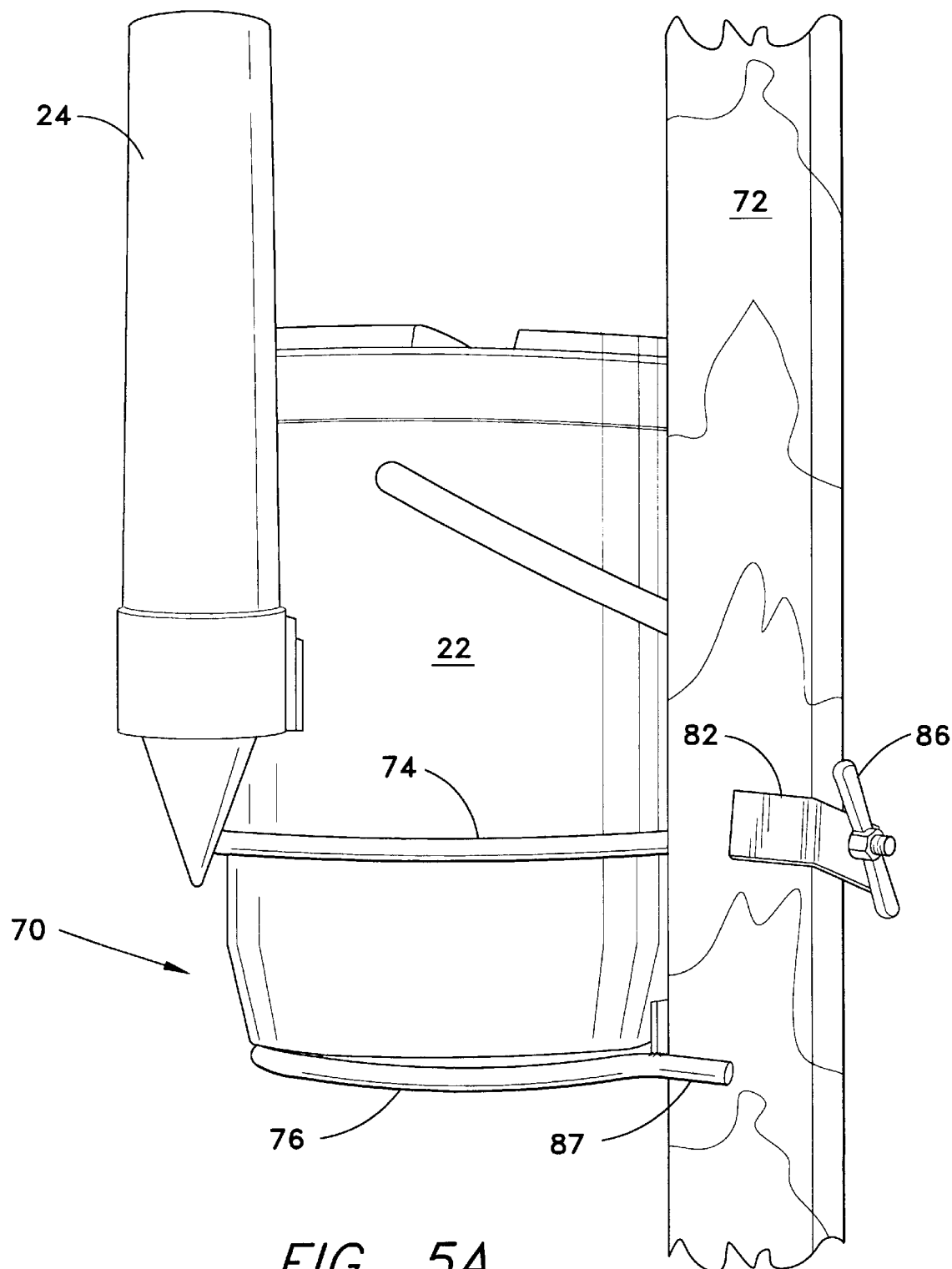
FIG. 5A is an environmental side elevational view of a fifth embodiment of water cooler holder with a cup holder attached to a vertical stud according to the present invention.
Figure 5B:
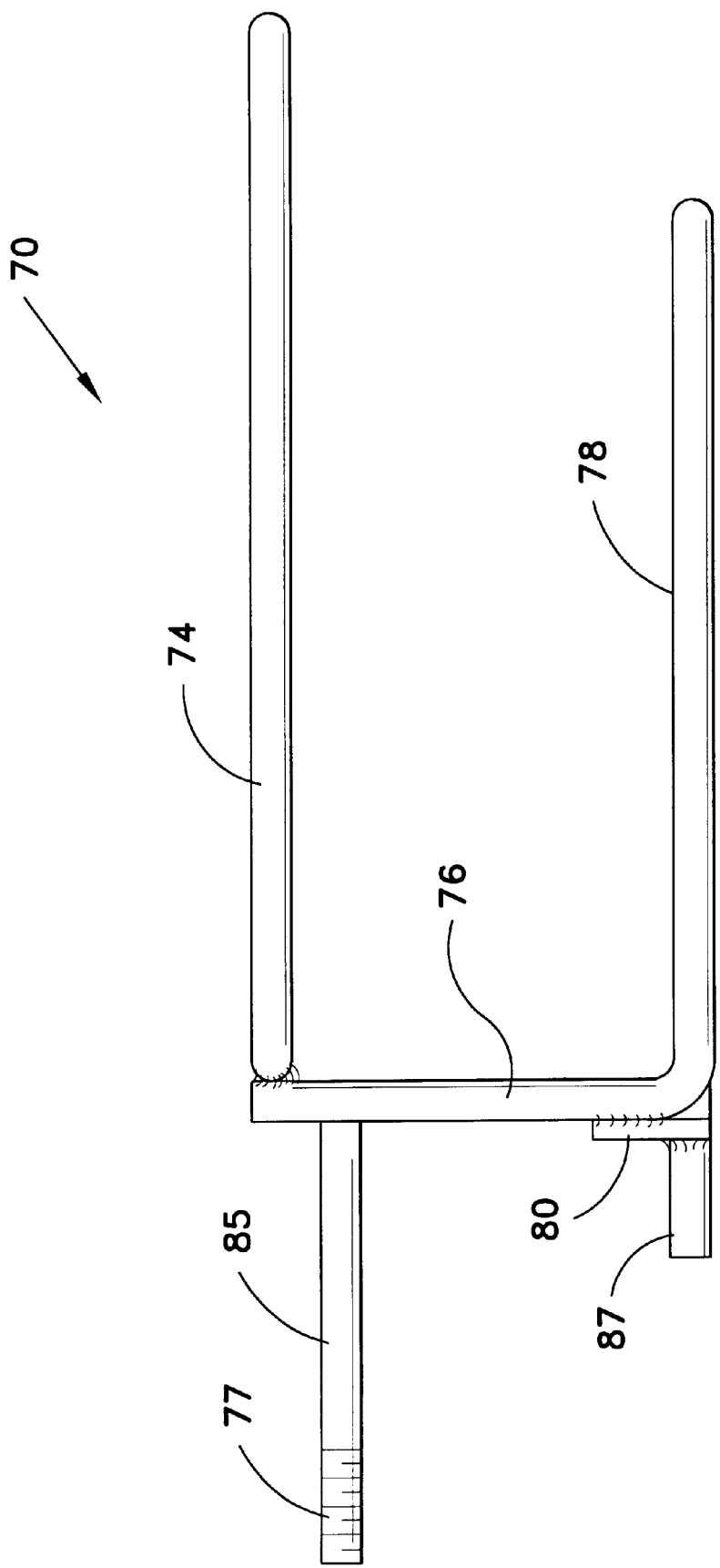
FIG. 5B is a side elevational view of the fifth embodiment of the water cooler holder according to the present invention.
Figure 5C:
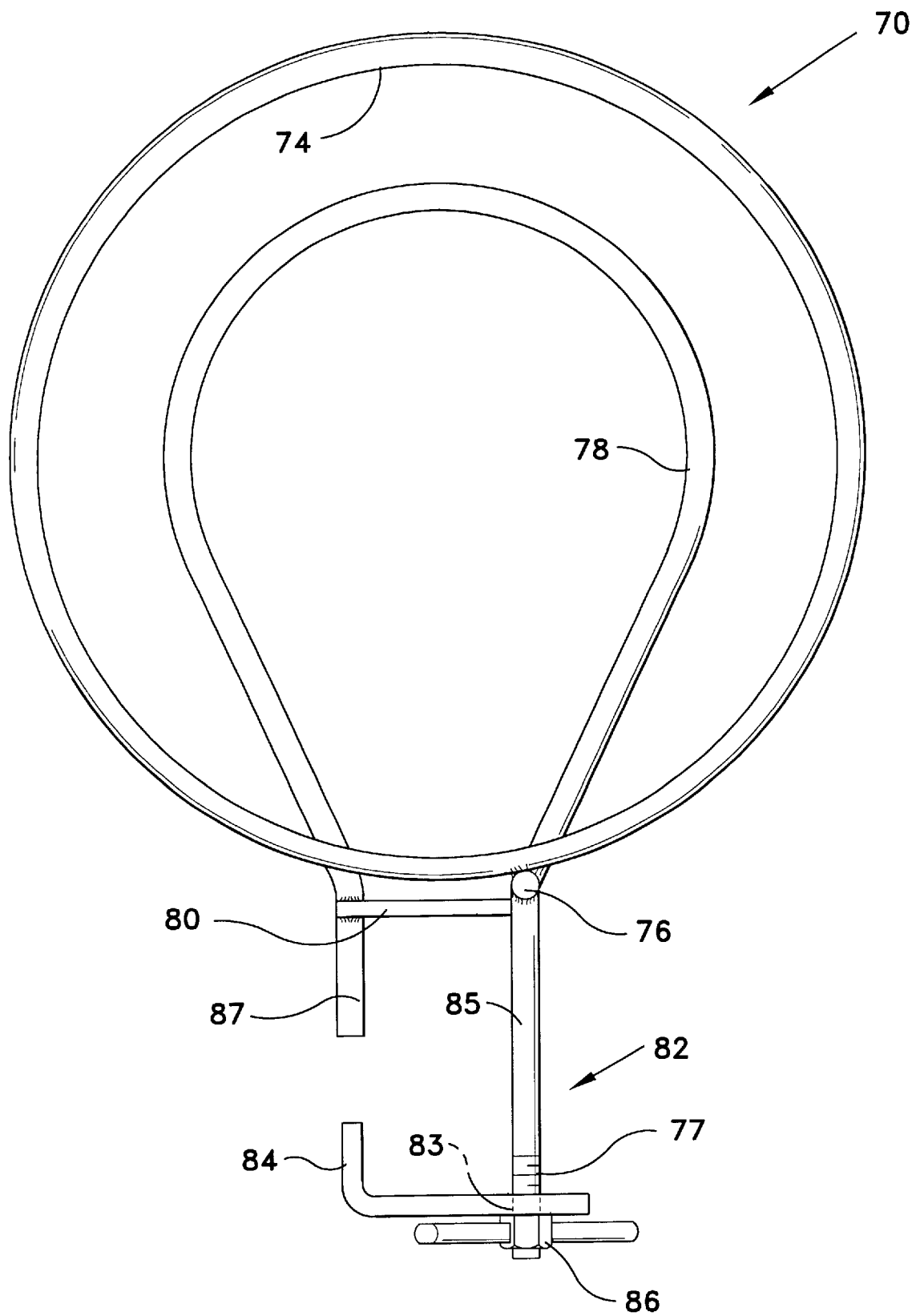
FIG. 5C is a top plan view of the fifth embodiment of the water cooler holder according to the present invention.

FIGS. 5A, 5B and 5C depict the fifth embodiment of a water cooler holder 70 attachable to either a two by four wooden stud 72 or a cylindrical post. A cup stack 24 is conveniently attached to the cooler 22 (FIG. 5A). A bulbous, ovoid loop 78 made from a cylindrical rod has an open end defined by one leg 76 extending up and normal to the loop 78. An upper ring 74 is attached to the end of the leg 76, so that the upper ring 74 is disposed parallel to and above the loop 78, the upper ring 74 having a larger diameter than the curvature of the loop 78. A reinforcing bar 80 is welded across the opening of the loop 78 and the leg 76. A pair of parallel studs 87 (only one seen in FIG. 5C), the other being symmetrically disposed below rod 82) extend rearward from the reinforcing bar 80 and are coplanar with the loop 78. A threaded rod 85 extends rearward from the upright leg 76 parallel to and just below the plane of ring 74. An L-shaped plate 84 has an aperture 83 defined therein so that the plate 84 is slidable on the threaded end 77 of the rod 85 to define a clamp 82, the clamp 82 being secured to the post 72 by wing nut 86 with the stubs 87 being spaced apart on opposite sides of the post 72 to prevent rotation of the cooler holder 70 around the two by four post 72.

Figure 6A:
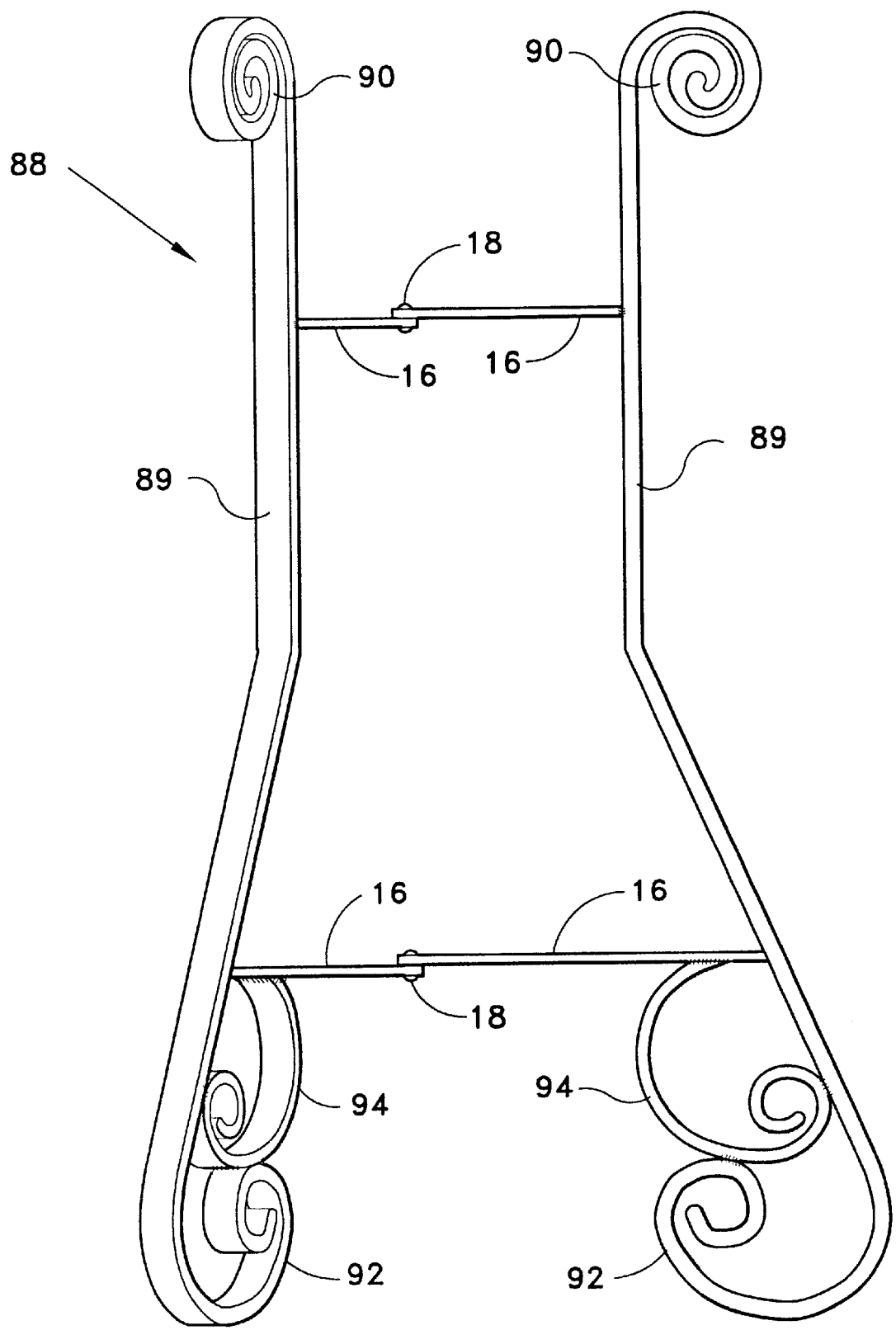
FIG. 6A is an elevational view of a sixth embodiment of an ornamental water cooler holder according to the present invention.
Figure 6B:
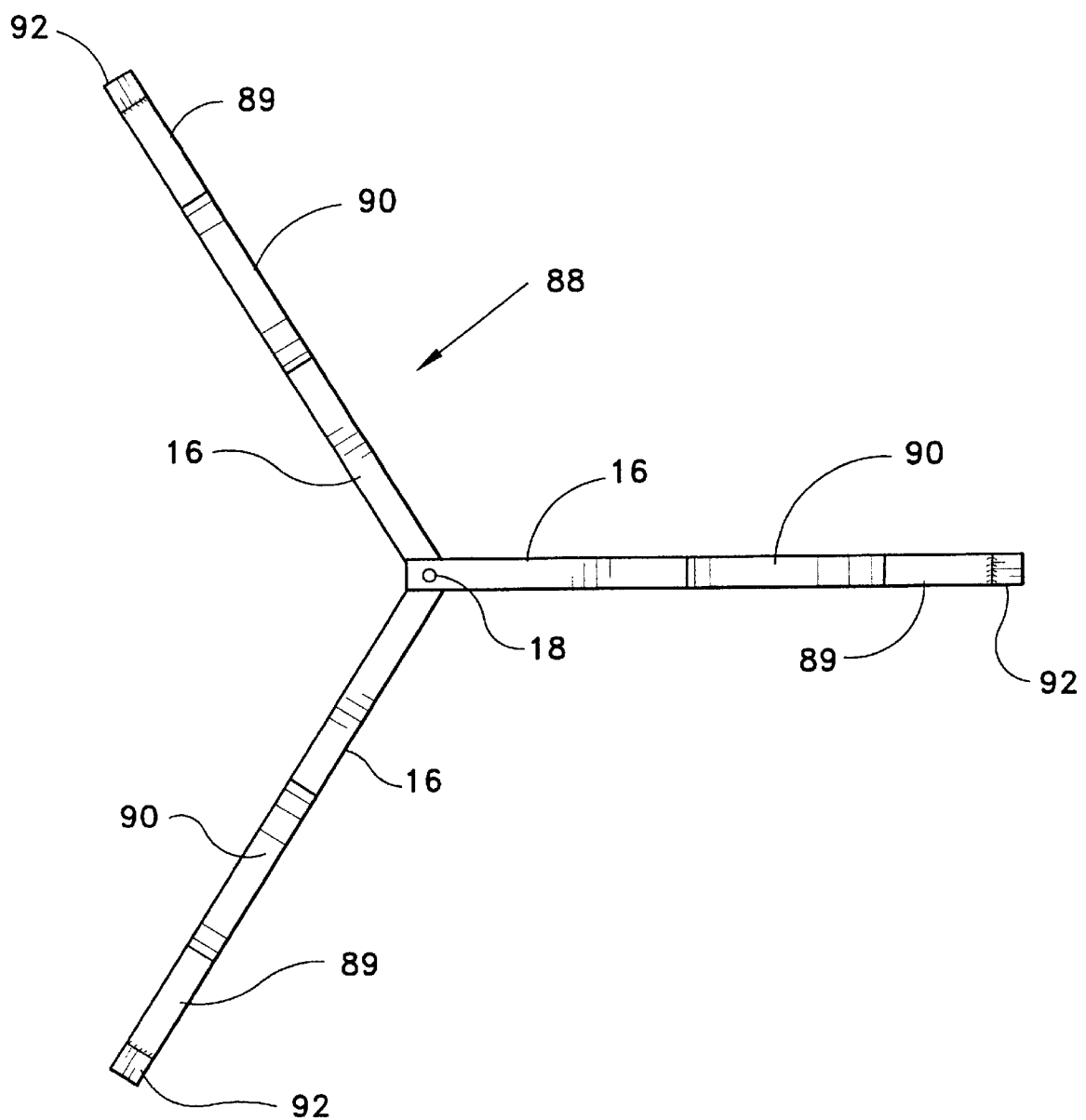
FIG. 6B is a top plan view of the sixth embodiment according to the present invention.

FIGS. 6A and 6B are drawn to a sixth embodiment which is similar to the first embodiment of FIGS. 1A–C, wherein a decorative foldable tripod cooler holder stand 88 has ornamental spiral segments added to the structure. Each upright bent leg 89 (one leg hidden) has a spiral segment 90 on top, a spiral segment 92 on its bottom, and a spiral segment 94 added as a reinforcement for the bottom spiral segment 92 and a flat folding bar 16. A pair of pivot pins 18 permit the collapsing of the bars 16 and the holder stand 88. The ornamental features enhance the attractiveness of the cooler stand 88 as well as reinforce the bottom folding bars 16.

Figure 7A:
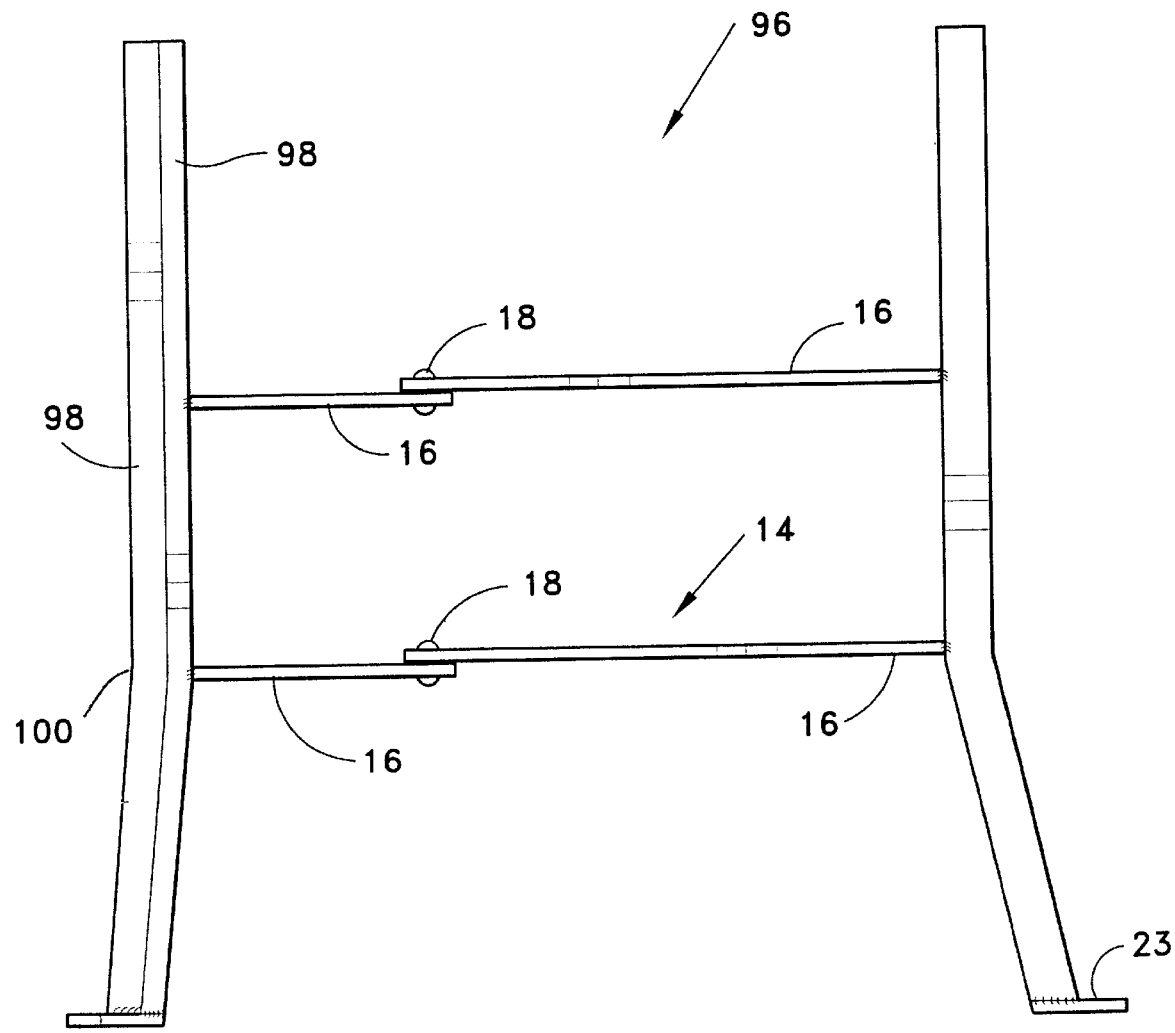
FIG. 7A is a side elevational view of a seventh embodiment of a shortened collapsible tripod water cooler holder according to the present invention.
Figure 7B:
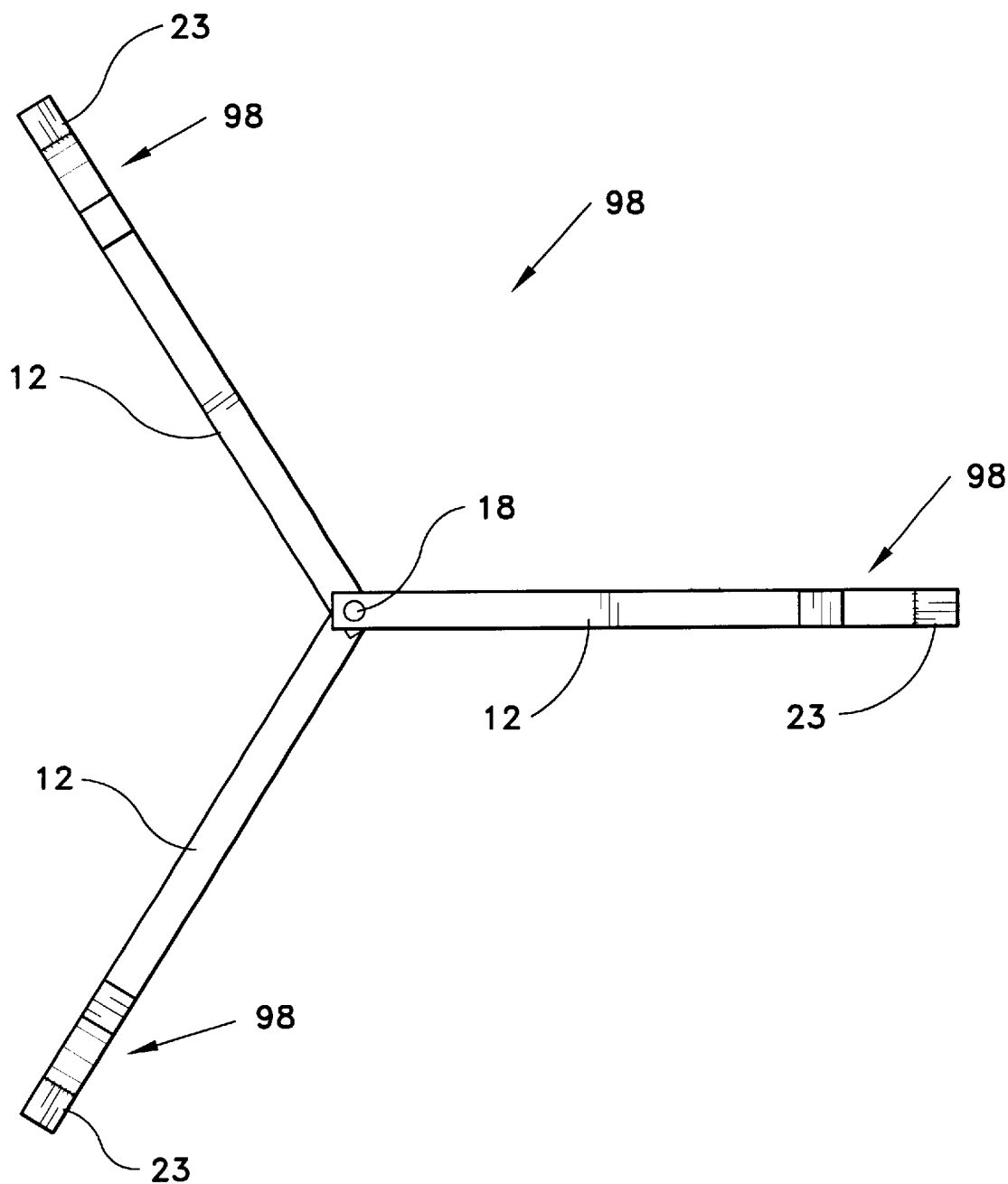
FIG. 7B is a top plan view of the seventh embodiment according to the present invention.

The seventh embodiment is illustrated in FIGS. 7A and 7B as a shortened upright folding tripod stand 96 for holding a cooler container having short legs 98 with the bends 100 now located at the junction of the lower folding bars 16 of the lower tripod support 14 with the legs 98. Each leg 98 has an extended foot 23. Pivot pins 18 fold the bars 16 of the upper and lower tripod support bars 12 and 14, respectively. This shortened stand embodiment permits its use on available supports such as a table, low wall and the like.

It is to be understood that the present invention is not limited to the embodiments described above, but encompasses any and all embodiments within the scope of the following claims.

I claim:

1. A collapsible, free standing holder for supporting a cylindrical water cooler having a bottom and a side, said water cooler holder comprising:

three upright bar legs, each of said legs having a straight upper portion terminating in a bend and a lower portion extending outward from the bend;

three horizontally disposed upper tripod support bars, each of said upper support bars having a first end and a second end, each said first end being separately secured to each of said legs at a position above the bend in the upper portion, and each said second end being pivotally connected together; and three horizontally disposed lower tripod support bars, each of said lower support bars having a third end and a fourth end, each said third end being separately secured to each of said legs at a position spaced downward from the bend, and each said fourth end being pivotally connected together;

wherein the upper tripod support bars are adapted for supporting the bottom of the water cooler and the straight upper portion of each of the three legs is adapted for engaging the side of the water cooler when the holder is in a free standing position, and whereby the holder is pivotally collapsible when not in use.

2. The water cooler holder according to claim 1, wherein each of said legs has an outwardly extending foot portion.

3. The water cooler holder according to claim 1, wherein each of said legs has a hollow square cross-section.

4. The water cooler holder according to claim 1, wherein each of said upper and the lower tripod support bars are flat bars.

\* \* \* \* \*